(12) United States Patent
Veryaskin et al.

(10) Patent No.: US 11,002,878 B2
(45) Date of Patent: May 11, 2021

(54) INTRINSIC GRAVITY GRADIOMETER AND GRAVITY GRADIOMETRY

(71) Applicants: The University of Western Australia, Crawley (AU); Alexey Vladimirovich Veryaskin, Crawley (AU)

(72) Inventors: Alexey Vladimirovich Veryaskin, Crawley (AU); Jeremy Francis Bourhill, Crawley (AU); Eugene Nikolay Ivanov, Crawley (AU); Michael Edmund Tobar, Crawley (AU)

(73) Assignees: The University of Western Australia, Crawley (AU); Alexey Vladimirovich Veryaskin, Crawley (AU)

( * ) Notice: Subject to any disclaimer, the term of this patent is extended or adjusted under 35 U.S.C. 154(b) by 171 days.

(21) Appl. No.: 16/342,926

(22) PCT Filed: Oct. 23, 2017

(86) PCT No.: PCT/AU2017/051159
§ 371 (c)(1),
(2) Date: Apr. 18, 2019

(87) PCT Pub. No.: WO2018/071993
PCT Pub. Date: Apr. 26, 2018

(65) Prior Publication Data
US 2020/0057174 A1    Feb. 20, 2020

(30) Foreign Application Priority Data

Oct. 21, 2016    (AU) ................................ 2016904294

(51) Int. Cl.
*G01V 7/04*        (2006.01)
(52) U.S. Cl.
CPC ..................................... *G01V 7/04* (2013.01)

(58) Field of Classification Search
CPC ... G01V 7/04; G01V 7/02; G01V 7/06; G01V 7/16
(Continued)

(56) References Cited

U.S. PATENT DOCUMENTS 2,523,075 A * 9/1950 Sweet ....................... G01V 7/08
                                                      73/382 R
2,711,514 A    6/1955 Rines
(Continued)

OTHER PUBLICATIONS

Regal, C.A., et al, "Meausring nanomechanical motion with a microwave cavity interferometer" Nature Physics 2008, vol. 4, pp. 555-560.

*Primary Examiner* — Robert R Raevis
(74) *Attorney, Agent, or Firm* — Charles H. Jew

(57) ABSTRACT

A sensing element (10) for an intrinsic gravity gradiometer (IGG) for use in sensing variation in a gravity field at a location. The sensing element (10) is flexible, elongate and has unfixed opposed ends (12, 14) when part of the gravity gradiometer. The sensing element can be a metallic ribbon, and can be mounted by a number e.g. 3 or 5, pivot points or axes 30-40 at each of the opposed sides along the sensing element, with the opposed ends of the sensing element free to move. The pivot points or axes can include pins, preferably cylindrical pins (48) or the sensing element may be etched within the side wall and remain joined to the remainder of the side wall by connections. The sensing element (10) can form part of one or more resonant cavities or wave guide (44, 52-66), such as a side or dividing wall (46) or part thereof. A dual phase bridge (61,612) arrangement can be provided. Electrical current (I) can be injected into the sensing element. Feed forward motion compensation (MC or FFMC) can be applied as part of the determination of the current. Applying electrical current into the opposed longitudinal sides (20, 22), such as right and left sides, of the (Continued)

sensing element, such as a ribbon, can be used for several types of compensation. Displacement of the sensing element can be detected by a resonant cavity, electromagnetic sensor or optical sensor.

19 Claims, 9 Drawing Sheets

(58) Field of Classification Search
USPC ......... 166/250.01, 250.16; 73/382 R, 382 G, 73/152.01; 702/6, 11
See application file for complete search history.

(56) References Cited

U.S. PATENT DOCUMENTS

| | | | |
|---|---|---|---|
| 3,190,129 A | | 6/1965 | Kritz |
| 3,273,397 A | * | 9/1966 | Forward ................. G01V 11/00 73/382 R |
| 3,564,921 A | * | 2/1971 | Bell ........................ G01V 7/10 73/382 R |
| 4,599,896 A | * | 7/1986 | Stewart ................. G01P 15/132 73/382 R |
| 6,713,938 B2 | | 3/2004 | Nguyen |
| 6,742,390 B2 | | 6/2004 | Mochida |
| 2005/0160815 A1 | | 7/2005 | Lee |
| 2010/0071461 A1 | | 3/2010 | Beverini |
| 2013/0055808 A1 | | 3/2013 | Van Kann |
| 2014/0000362 A1 | * | 1/2014 | DiStasio ................. G01V 7/16 73/382 G |

* cited by examiner

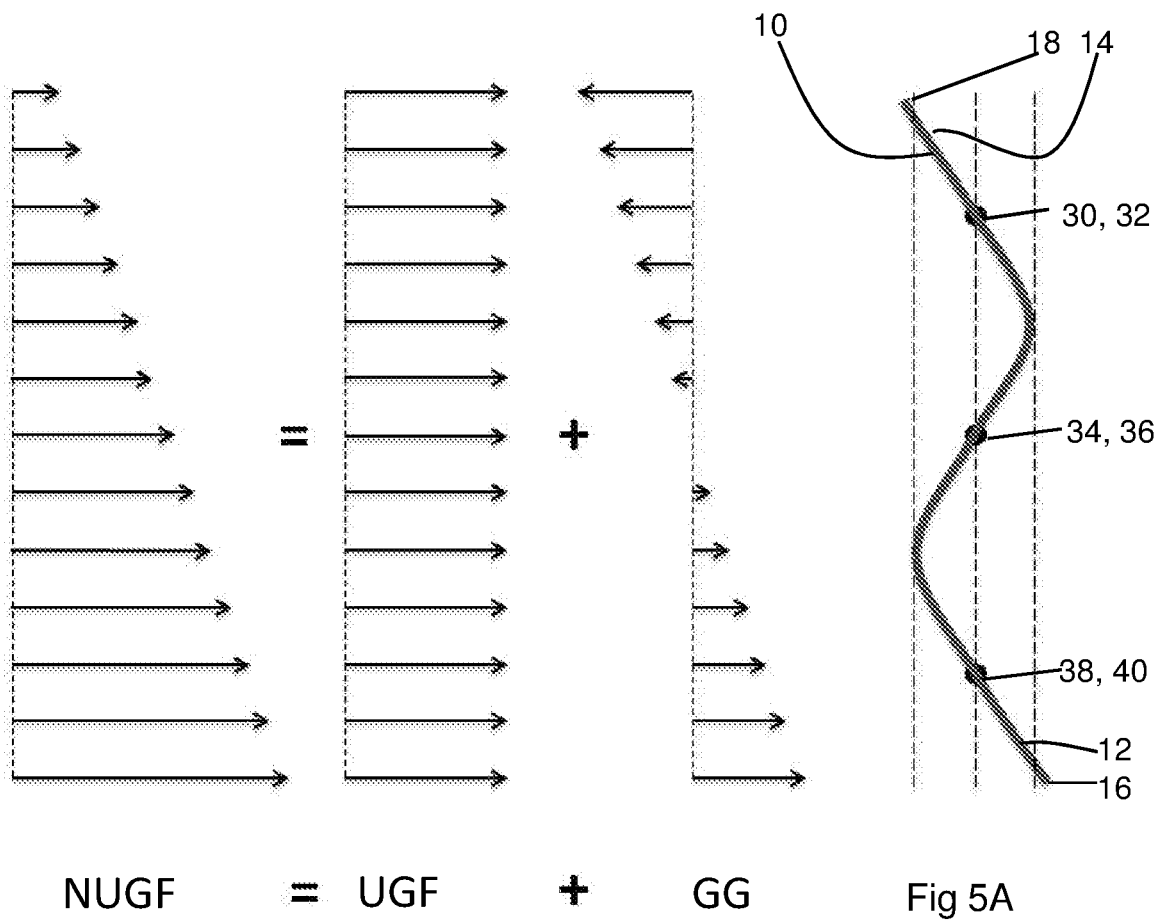
NUGF = UGF + GG    Fig 5A
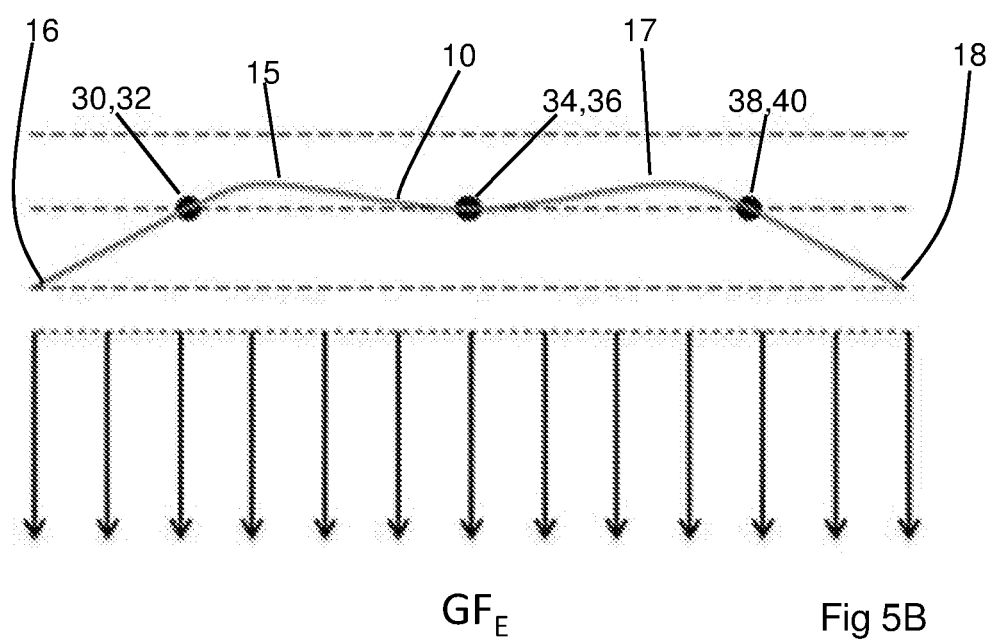
GF$_E$    Fig 5B

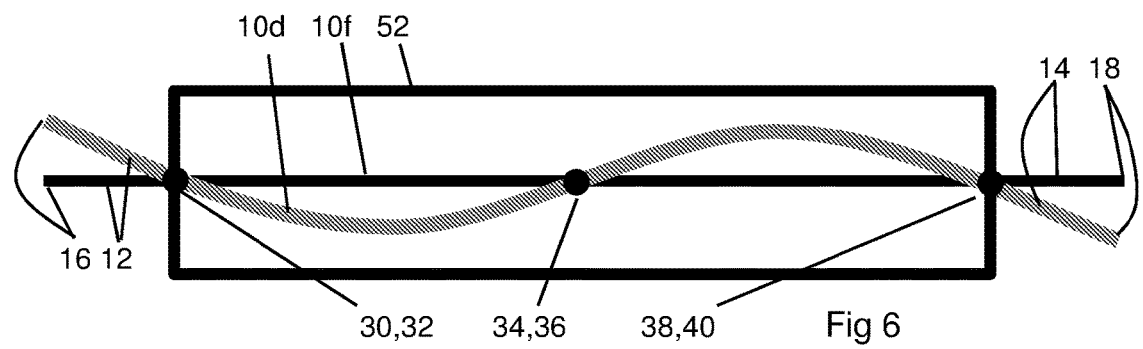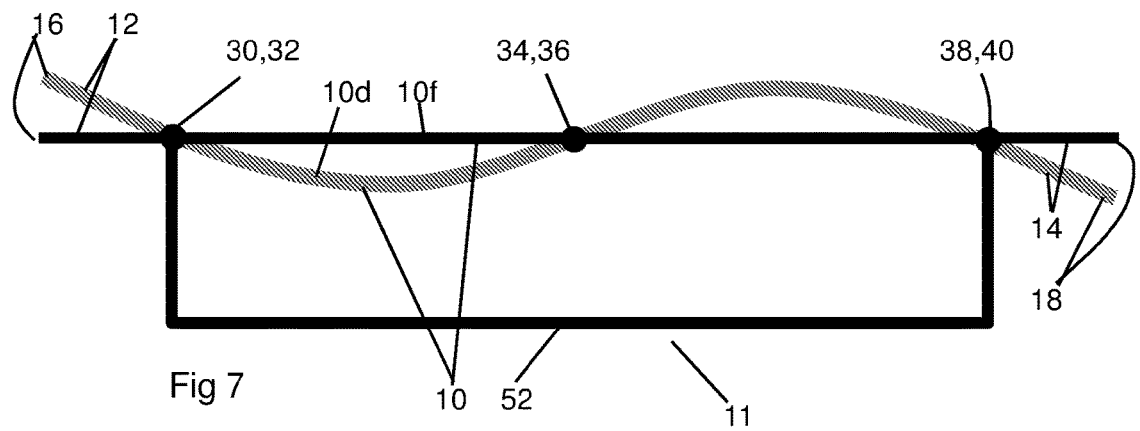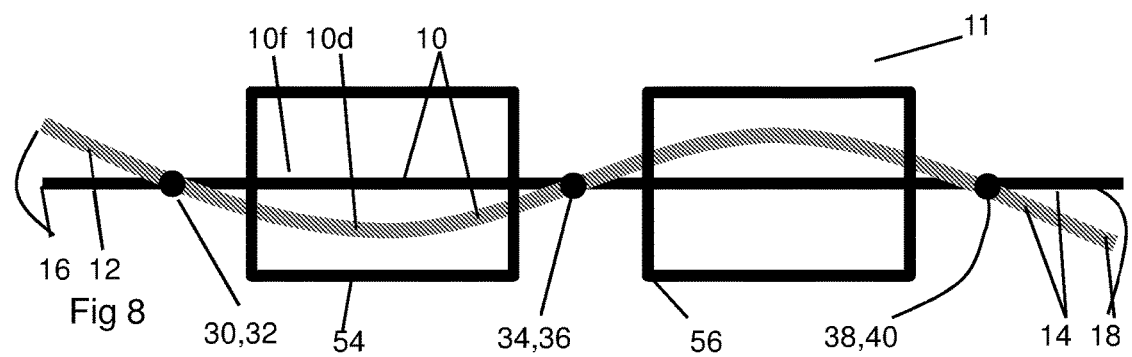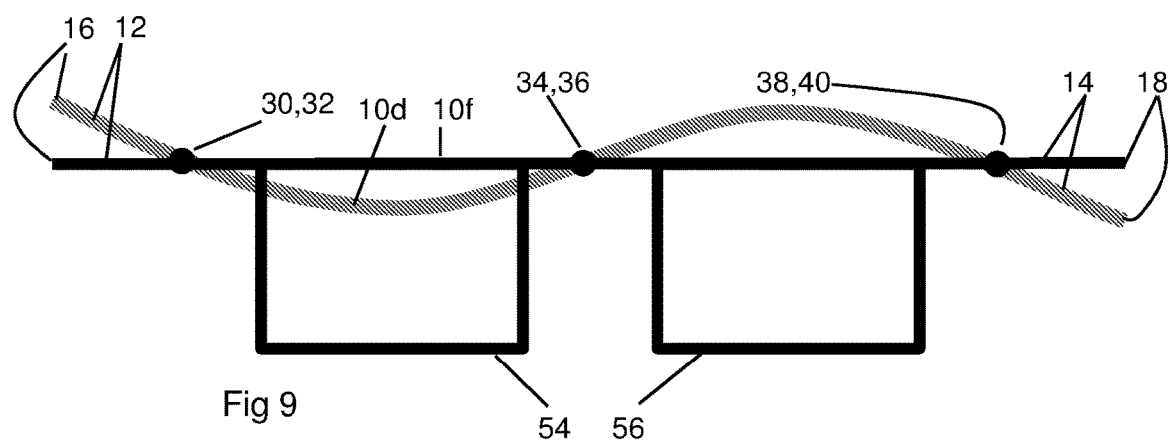

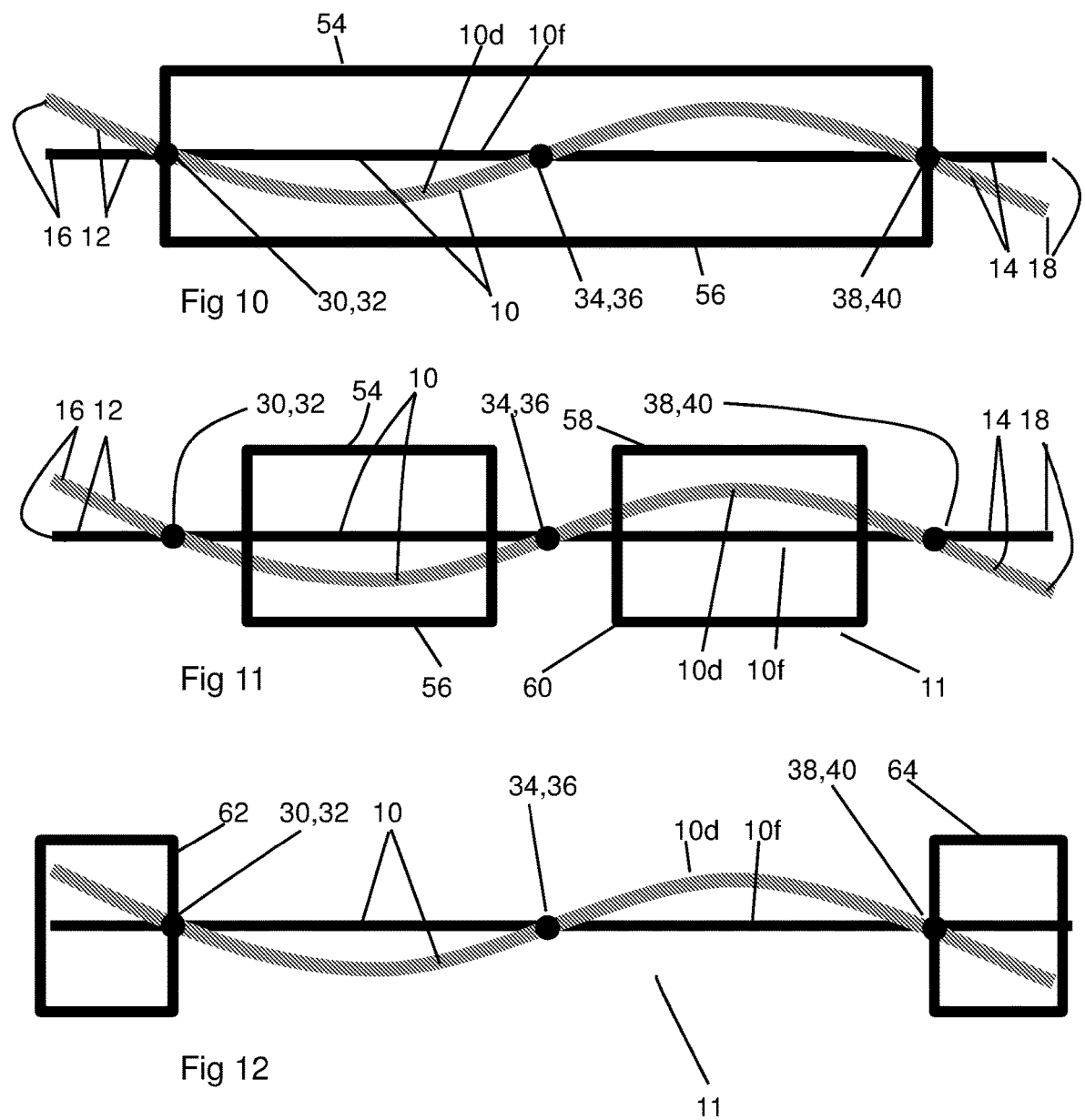

INTRINSIC GRAVITY GRADIOMETER AND GRAVITY GRADIOMETRY

FIELD OF THE INVENTION

The present invention relates to a sensing element for an intrinsic gravity gradiometer (IGG), to a sensor for an intrinsic gravity gradiometer (IGG), to an intrinsic gravity gradiometer (IGG) apparatus, to a method of operating an IGG and/or to a method of conducting gravity gradiometry using an IGG.

The present invention can be particularly, though not solely, applied to borehole gravity gradiometry using an IGG embodying the present invention, intended for application inside drilled wells.

The present invention can be particularly, though not solely, applied to moving-base gravity gradiometry, such as utilisation in aerial surveying and aerial gravity measurements.

Aerial surveying and aerial gravity measurements may be conducted by providing the IGG in or on an unmanned aerial vehicle (UAV) or a piloted aircraft (including fixed wing or rotary wing aircraft).

Intrinsic gravity gradiometry (IGG) is to be understood to mean that a gravity gradient can be measured/detected at a location by the apparatus without needing to move the apparatus to a second location to derive a difference in gravity field between gravity measurements between the two locations or the need to use two gravimeters at separate locations.

Nevertheless, the IGG can be moving, such as in an aircraft to obtain aerial gravity gradient measurements, but is capable of obtaining gravity gradient measurements intrinsically/inherently at a single location or at a particular moment in time without the need for multiple spatially or temporally separated measurements.

The IGG and components therefor, such as the sensing element, are to be understood to be for use in sensing/measuring a gravity gradient at a location without the need for movement of the IGG to another location or the need to obtain separate measurements with two gravity gravimeters.

By utilising such an IGG, it is possible to measure direct gravity gradients at a location without gravitational and/or kinematic acceleration.

BACKGROUND TO THE INVENTION

Gravity gradients provide valuable information about the presence and/or nature of underground/subsea oil, gas and mineral resources, and assist with navigation, defense and several other areas of industrial, commercial and technological endeavour.

In particular (but not solely), gravity gradiometry is used by oil and mineral resource prospectors to measure the density of the underlying ground formation. A picture of subsurface anomalies is built-up which is then used to more accurately target subsurface deposits, such as oil, gas and mineral reserves. Gravity gradiometry is also used to image water column density, when locating submerged objects, or determining water depth, and is used to compensate for anomalies affecting navigation systems, such as the oblateness of the earth.

Accurately measuring direct gravity gradients is difficult. However, there has been a considerable investment, both in terms of time and money, into the development of various types of gradiometers driven by the extremely valuable type of information that is contained in gravity gradients.

An intrinsic gravity gradiometer (IGG) is disclosed in an international patent application published as WO 96/10759. A flexible metal 'string', held under tension between fixed ends, is used to measure two off-diagonal ($G_{xz}$ and $G_{yz}$) direct gravity gradients. It has been revealed ("A novel combined gravity & magnetic gradiometer system for mobile applications", Veryaskin 2000) that a string-like object possesses a dynamic degree of freedom (i.e. the second violin mode described as S-mode) which is coupled only to a direct gravity gradient. In contrast, gravitational and/or kinematic acceleration is coupled to a different dynamic mode (i.e. the first violin mode described as C-mode). By measuring the mechanical displacements of the S-mode, it is possible to measure only direct gravity gradients and not gravitational and/or kinematic acceleration.

Due to the large value of the Earth's ambient gravitational acceleration, the C-mode displacements are coupled to read-out measurements. This is caused by misalignment of the 'string's' displacement measuring means as explained in another international patent application published as WO 03/027715. This problem is well known as the "common mode" problem, which persists in most, if not all, known gravity gradiometers.

In WO 03/027715, further improvements to the string-based gravity gradiometer design are provided. A new boundary condition (constraint) along with fixed ends was introduced in the mid position of a uniform metal wire or ribbon in the form of a knife-edge. This practically eliminates the C-mode dynamic motion of the sensing element leaving the S-mode related degree of freedom relatively unchanged.

However, as explained in another international patent application published as WO 2010/061183, a string or any other string-like object with fixed ends and clamped mid position still possesses an unwanted mechanical degree of freedom (W-mode or sag mode), coupled with the uniform gravitational and/or kinematic acceleration, and effectively represents a gravimeter and a gradiometer, rather then a gravity gradiometer only.

In order to further reduce or completely eliminate all unwanted mechanical degrees of freedom, some new mechanical string-like or ribbon-like workable sensing elements were introduced in WO 2010/061183. By arranging the ribbon to have a varying rigidity and/or mass profile along its length such that the deformation of the ribbon in its W-mode of oscillation is suppressed, the effect of acceleration on the ribbon displacement is low and the contribution of the 'gravimeter' component in the signal detected by the sensing means is also low. Therefore the gradiometer signal is easier to detect against a quieter 'gravimeter' signal.

Similarly, by arranging the ribbon to have a varying rigidity and/or mass profile such that the deformation of the ribbon in its S-mode modes of oscillation is enhanced, the effect of a gravity gradient on the ribbon displacement is high and the contribution of the gradiometer component in the signal detected by the sensing means is also high.

However, the arrangement disclosed in WO 2010/061183 takes a step back from the pure string-like or ribbon-like objects with uniform mass distribution and simple symmetric geometries. The non-uniform rigidity and/or mass profile cannot be made exactly the same along the whole length. This will make the sensing elements behave more like a string of stand alone 'gravimeters' with different masses coupled to each other and make the manufacturing process more complex and costly. The tolerance requirements may well be unreachable in order to get the desired effect of suppressing all unwanted mechanical degrees of freedom and more problems than advantages may result.

From this point of view, the simpler the geometry of the sensing element the easier it will be to manufacture it with tolerances close enough to meet requirements for an 'ideal gradiometer'.

It is noted that the sensing element (string or ribbon like) disclosed in each of the aforementioned published patent documents are clamped at both opposed ends and in the middle and held under tension, no matter if they have a uniform or non-uniform mass profile and cross sections.

With the aforementioned limitations of known gravity gradiometers in mind, the present invention seeks to provide improved functionality and/or accuracy for a gravity gradiometer.

SUMMARY OF THE INVENTION

It is an aim of the present invention to provide an apparatus for measuring direct gravity gradients with improved sensing elements capable of operating in a room-temperature environment.

It is a further aim of the present invention to provide methods for measuring/detecting mechanical displacements of the sensing element(s) of an intrinsic gravity gradiometer, which result from the direct gravity gradients, with improved sensitivity and/or stability.

In addition or alternatively, one or more forms of the present invention seeks to provide a method of modulation-demodulation of the desired gravity gradient signals in order to eliminate zero-point drift, which is a profound problem in all non-modulating (static) gravity gradiometers.

A gravimeter of the prior art needs to take at least two readings at different locations or have two spatially separated sensors measuring simultaneously at two different locations to determine a gravity gradiometric reading.

In contrast, it will be appreciated that one or more forms of the present invention utilises a single sensing element in an intrinsic gravity gradiometer (IGG) that is arranged and configured to obtain a direct gravity gradiometry measurement in a single reading, without moving or rotating the IGG.

One or more forms of the present invention enables inherent/intrinsic acquisition of gravity gradiometry measurements reading in a single measurement, and without the IGG moving or rotating.

In one aspect the present invention provides an intrinsic gravity gradiometer apparatus for measuring direct gravity gradients, including: a sensing element being flexible, elongate and having unfixed opposed ends and is un-tensioned longitudinally between the unfixed opposed ends.

Preferably the flexible elongate sensing element may be uniform along its length between the two opposed ends.

More preferably, the sensing element may include two parallel and spaced sides extending between the two opposed ends.

The sensing element may be generally or substantially rectangular.

The apparatus may include read-out means for displaying or recording measurements of one or more mechanical displacements of the sensing element.

The apparatus may include modulation means and/or de-modulation means to respectively modulate and/or demodulate signals resulting from direct gravity gradients.

The sensing element may include a strip having free ends when part of the apparatus.

Preferably the strip is predominantly of metal, but may include metal and one or more other materials, or may include metallic material(s).

Preferably the sensing element (such as the strip) may be rotationally pivoted between the opposed ends at multiple connection points. More preferably, the multiple connection points may be distributed along parallel side edges along the length of the elongate sensing element. In a preferred form, the sensing element may be rotationally pivoted at six symmetrically distributed points.

Preferably, a number of said connection points may be distributed along each of the side edges of the length dimension of the sensing element (e.g. of the strip). More preferably, each of the connection points connects only to the side edge without touching either of the faces of the strip e.g. the front or upper, and back or lower faces that extend across the strip between the opposed side edges.

Preferably the sensing element is of or incorporates an electrically conductive material, such as copper, or alloys incorporating different metals. Preferably the sensing element is highly non-magnetic to avoid magnetic fields impacting the operation of the device.

Preferably a pair of opposed connection points/pivot points may be provided at a mid point along the respective longitudinal side edges of the sensing element.

Other pairs of opposed connection points/pivot points may be provided respectively between the mid point and a respective end of the sensing element.

More preferably, the other pairs of sensing elements may be provided at a respective equal distance along the sensing element from the mid point.

Still more preferably, the other pairs of connection points may be provided at a respective equal distance between the mid point and the respective end of the sensing element e.g. half way between the mid point and the respective end.

It will be appreciated that the opposed connection points/pivot points may be provided as axes allowing the elongate sensing element to flex longitudinally about laterally disposed such axes.

Preferably the sensing element is pivoted for flexural rotation about three axes disposed at spaced intervals along a length of the sensing element. Preferably the three axes are provided with one axis aligned across a mid point of the sensing element and each of the remaining two axes respectively spaced intermediate the mid point and the respective free end of the sensing element.

The sensing element may be supported by more than three axes, such as five or seven axes, which still allow the sensing element to deflect within a gravitational field.

The sensing element may be provided as part of an apparatus that senses displacement of the sensing element, particularly of the free ends, resulting from a gravity gradient applied to the sensing element. For example, one or more, preferably at least two, displacement sensors may be provided. More preferably, a displacement sensor may be provided at or adjacent each of two opposed ends of the sensing element. The displacement sensor(s) may include magnetic, electromagnetic and/or optical displacement sensing capability.

Force feedback may be applied to the sensing element, such as based on a modulation technique—and preferably demodulating at a switching frequency in either a hardware or software domain to cancel 1/f noise.

The apparatus may include means for sensing displacement of the free ends and/or of the portions of the sensing element disposed between the connection points/pivot axes.

Preferably, the sensing element is arranged to pivot on three or more axes.

At least part of the sensing element may be disposed into one or more resonant cavities or wave guides, such as a microwave cavity. The resonant cavity or cavities may be utilised to provide displacement sensing of the sensing element.

Movement of the sensing element may be compensated for by a compensation arrangement.

The dynamic characteristics of such sensing element is much more complex compared to a sensing element with fixed opposed ends and clamped mid position as there are more boundary conditions to be taken into account.

A magnetic field may be applied across the sensing element.

Compensating for the measured acceleration can be provided by feeding a current through the sensing element which causes an equal counteracting force within the magnetic field.

Boundary conditions include:
1. the second and the third spatial derivatives of the strip's lateral displacement must be equal to zero at the free ends of said strip (meaning there cannot be any bending moment at the end of the strip);
2. the lateral displacement of the strip is equal to zero at all of the pivot points;
3. the second spatial derivative of said displacement must be equal to zero at all pivoted points.

It will be appreciated that one or more forms of the present invention provides a unique and novel sensing element which requires different mathematical treatment and finite element (FE) analysis/modelling to be applied to its physical and/or functional characterization.

The new sensing element possesses new degrees of freedom (modes), due to more boundary conditions and the free ends which are the integral parts of the whole sensing element. These new modes can be used to detect gravitational gradients instead of the S-mode as disclosed in WO 96/10759, WO 03/027715 and WO 2010/061183. One of such modes is shown in FIG. 5. It can be called the "Z-mode" in order to distinguish from that used to detect gravitational gradients in referenced patents and other publications.

In the previous gravity gradiometer designs with string-like or ribbon-like sensing elements fixed at both ends and in the mid position, there are only two positions where the lateral mechanical displacement of said sensing element reaches its maximum. In the purely uniform mass distribution case, they are at one quarter and three quarters distance from the fixed ends. The lateral mechanical displacements are measured by read-out means in those positions.

It is difficult to provide both the read-out means and feedback providing means at the same locations. Feedback forces, which are in proportion of said mechanical displacements, are needed to control the gravitational responsivity of the sensing element to be optimum and provide means for a modulation-demodulation process as disclosed in the present invention.

The free ends of the introduced sensing element can be used in this invention for the mechanical displacement measurements while the nodes in the middle of the sensing element are used for applying the feedback forces. Therefore, unlike all previous relevant gravity gradiometer designs, the read-out means and the feedback means of one or more embodiments of the present invention can be spatially separated, which increases the operational capabilities of the gravity gradiometer.

Also, one or more embodiments of the present invention allow for positioning the read-out means at the edges of the free ends of the sensing element. In such arrangements, the feedback forces can be applied at the maximum displacement nodes located in between the middle pivot and the locations of side pivots.

The said feedback forces can be applied in the periodic manner as disclosed in New Zealand patent No 272634 and in patent publication WO 96/10759. In patent publication WO 2011/001154, means to modulate stiffness of a sensing element are disclosed comprising spring flexures and piezo-actuators coupled to the ends of string-like or ribbon-like objects. As tension was initially an integral part of known previous gravity gradiometers, the tension can be set to a lower value and then to a higher value by applying a control voltage to said piezo-actuators.

This periodic tension modulation process changes the gravitational responsivity of the sensing element and provides modulation of the system output signal.

The signal then can be demodulated at the switching frequency in the software domain which will result in cancelling 1/f noise inherent to all static (non-modulating) gravity gradiometer designs.

However, the mechanical disturbances directly applied to the sensing element can provide unwanted side-effects like parametric instabilities and other possible disturbances.

It is desirable to keep any links that connect the sensing element to an external sensor frame at a minimum and not to use the modulation means directly connected to the opposed ends of the sensing element.

In this invention the sensing element is not held under any tension and therefore the tension modulation is not applicable.

According to one or more forms of the present invention, the means that provide the desirable modulation process can be applied indirectly by using permanent magnets positioned near maximum mechanical displacement points in between the mid pivot and side pivots as depicted in FIG. 16.

Such a solution is different from that of disclosed in WO 96/10759 where two adjacent linear currents were used to provide the desired feedback force and the periodic modulation o gravity gradiometer output.

Preferably the sensing element forms at least part of a partition between two adjacent or conjoined resonant cavities or wave guides.

The apparatus may include an input receiving signals from at least one ancillary device. The apparatus may include means to utilise the received signals to generate a feed-forward compensation signal to cancel out certain motion characteristics of the sensing element.

The sensing element may provide at least part of a side wall of a resonant cavity or wave guide. The sensing element may at least partly cover or partly fill an opening in the side wall of the resonant cavity or wave guide.

The sensing element may form at least part of a partition between resonant cavities or wave guides.

The at least one ancillary device may include at least one gyroscope or at least one accelerometer, or a combination of two or more thereof.

The apparatus may receive signals from at least one ancillary device to generate a feed-forward compensation signal to cancel out motion characteristics of the sensing element.

A further aspect of the present invention provides a method of controlling a gravity gradiometer including using signals from at least one ancillary device to generate a feed-forward compensation signal that is then used to cancel out motion effects of a sensing element of the gravity gradiometer.

Another aspect of the present invention provides a method of detecting a gravity gradient including measuring displacement of at least one free end of a sensing element mounted to a support at three or more pivot axes.

A further aspect of the present invention provides a method of calibrating, optimising or compensating for gravitational effects on the sensing element including the steps of introducing electrical current into the sensing element to force the sensing element to straighten from a deflected orientation caused by a gravity field.

According to one or more embodiments of the method, preferably the sensing element is returned to or near to being straight along a substantial portion of its length.

It will be appreciated that such calibrating, optimising or compensating methodology is separate to or in addition to feed-forward compensation for motion effects of the sensing element.

One or more embodiments of the present invention therefore compensates, calibrates and/or optimises for a 'steady state' configuration.

For example, the sensing element or each sensing element end (e.g. ribbon tip) position/orientation relative to a respective microwave cavity interface may be spaced at an optimal operating point for maximum sensitivity.

BRIEF DESCRIPTION OF THE DRAWINGS

One or more embodiments of the present invention will hereinafter be described with reference to the accompanying Figures, in which:

FIG. 5A shows an example of displacement of the sensing element, termed Z-mode displacement, according to an embodiment of the present invention.

FIG. 5B provides a representation of how a sensor element embodying the present invention reacts to the earth's gravitational field.

FIG. 6 shows an embodiment of the sensing element within a resonant cavity, with free ends of the sensing element extending beyond the cavity.

FIG. 7 shows an embodiment of the sensing element forming part of a side wall of a resonant cavity, with the free ends of the sensing element extending past the ends of the resonant cavity.

FIG. 8 shows an embodiment of the sensing element applied to two resonant cavities, the free ends of the sensing element extending beyond the resonant cavities.

FIG. 9 shows an embodiment of the sensing element forming part of a side wall of each of two resonant cavities, with the free ends of the sensing element extending past the ends of the resonant cavities.

FIG. 10 shows an embodiment of the sensing element forming or part of a dividing wall adjoining two adjacent resonant cavities, with the free ends of the sensing element extending past the ends of the resonant cavities.

FIG. 11 shows an embodiment of the sensing element forming or part of a dividing wall adjoining two adjacent resonant cavities of two spaced pairs of cavities, with the free ends of the sensing element extending past the ends of the resonant cavities.

FIG. 12 shows an embodiment of the sensing element with each free end disposed within a respective resonant cavity.

Figure 1:
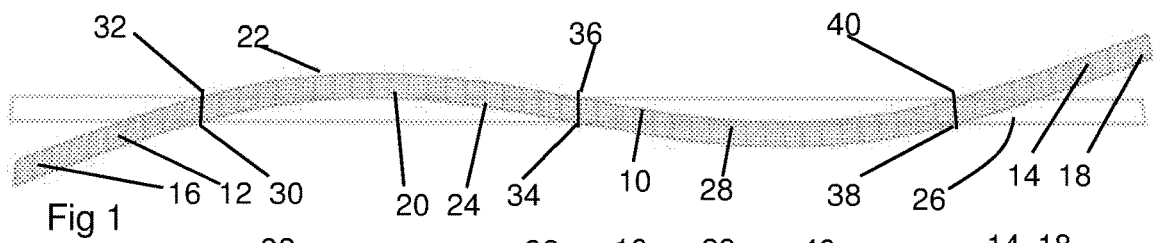
FIG. 1 shows a sensing element, such as for a gravity gradiometer, showing free ends.

It will be appreciated that the scope of various forms of the present invention is not to be limited by the specific embodiments described below with reference to the accompanying Figures.

DESCRIPTION OF PREFERRED EMBODIMENT

A direct gravity gradient means the true first spatial derivative of the gravitational acceleration vector along the sensitivity axis of an IGG (see an example in Table1 below).

TABLE 1

An example of the difference between a differential and an intrinsic gravity gradiometer.

| Gravity Gradiometer Type | Sensitivity axis | Measured quantity | Major problem |
| --- | --- | --- | --- |
| Differential (two sensing elements separated by a base line) | X | $(g_{Z2} - g_{Z1})/(x2 - x1)$ | Misalignment of sensing elements |
| Intrinsic (a single sensitive element) | X | $G_{ZX} = \partial g_z/\partial x = \partial g_x/\partial z$ | Read-out sensitivity limitations |

As shown in Table 1 above, the sensitivity axes of the respective gradiometers were chosen to be both aligned along the X direction. However, a gradiometer can have multiple sensitivity axes and measure all 5 independent gravity gradient components.

In relation to known gravity gradiometers, the general mathematical solution that describes the form-factor of the lateral mechanical displacements (modes) of said sensing element along the z-axis is as follows (reference, for example, page 8 in WO 96/10759, and on page 10 in WO 03/027715):

$$F_n(z) = \alpha \text{Sin}[\lambda_n z] + \beta \text{Sinh}[\lambda_n z] + \gamma \text{Cos}[\lambda_n z] +$$
$$\rho \text{Cosh}[\lambda_n z] + + \mu \frac{1}{\lambda_n} \int_p^z d\xi \text{Sin}[\lambda_n \xi] \text{Sinh}[\lambda_n (z-\xi)] + \nu \frac{1}{\lambda_n}$$
$$\int_p^z d\xi \text{Cos}[\lambda_n \xi] \text{Sinh}[\lambda_n (z-\xi)] + + \eta \frac{1}{\lambda_n} \int_q^z d\xi \text{Sinh}[\lambda_n \xi] \text{Sin}[\lambda_n (z-\xi)] +$$
$$\sigma \frac{1}{\lambda_n} \int_q^z d\xi \text{Cosh}[\lambda_n \xi] \text{Sin}[\lambda_n (z-\xi)]$$

where $_n$ (n=1, 2, 3 . . . ) are the eigenvalues of the following equation $$\frac{d^4 F_n(z)}{dz^4} = \lambda_n^4 F_n(z)$$

It contains 10-parametric groups of arbitrary coefficients ($\alpha$, $\beta$, $\gamma$, $\rho$, $\mu$, $\nu$, $\eta$, $\delta$, p, q) that should satisfy the ten boundary conditions above.

The mechanical displacement X(z,t) along the x-axis of the sensing element from its flat position, as a function of time and z-direction aligned along it, is as follows $$X(z, t) = \sum_n c_n(t) F_n(z)$$

Where $c_n(t)$ is the amplitude of the n-mode. In the quasi-static approximation (which is the case when one measures the Earth's gravity) the amplitude of the mechanical displacement of the sensing element along its length L is as follows:

$$c_n(t) = \frac{2P_n}{\omega_n^2 L} g_x(0, t) - \frac{2Q_n}{\omega_n^2 L} \Gamma_{xz}(0, t)$$

where $$g_x(z, t) = g_x(0, t) + \Gamma_{xz}(0, t)z,$$
$$P_n = \int_{-L/2}^{L/2} dz F_n(z),$$
$$Q_n = \int_{-L/2}^{L/2} dz z F_n(z)$$

and $F_n(z)$ is normalised such as $$\int_{-L/2}^{L/2} dz F_n(z) F_m(z) = \frac{L}{2} \delta_{mn} \quad (\delta_{mn} = 0 \text{ if } n \neq m, \delta_{mn} = 1 \text{ otherwise})$$

In the equations above, $g_x(z,t)$ is the gravitational acceleration acting on the sensing element, which contains a uniform (common mode) part $g_x(z=0,t)$ and a gravity gradient $_{xz}(z=0,t)z$. $_n$ is the mechanical resonant frequency of the corresponding n-mode.

$P_n$ and $Q_n$ are the sensor's mechanical susceptibilities to the common mode acceleration and gravity gradient consequently.

It directly follows from the equations above that if all of the n-modes satisfy the condition $F_n(z)=-F_n(-z)$ (anti-symmetric with respect to the centre of the sensing element), then $P_n=0$ for all n and the sensor is an intrinsic gravity gradiometer.

As the sensing element is heavily over constrained, the mathematical description used in all previous relevant patents is no longer applicable to the current invention.

The sensing element 10 according to one or more forms of the present invention is flexible and elongate. Preferably the sensing element is a strip.

As a strip, the sensing element has opposed ends 12, 14 with respective end edges 16,18, longitudinal side edges 20, 22 (such as left and right sides) and an upper face 24 and lower face 26.

As shown in FIG. 1, each of the opposed ends is free i.e. is not held or fixed. The sensing element is not held in longitudinal tension between the opposed free ends.

The sensing element 10 is connected to a support 28 at respective connection points 30-40, with three connection points disposed at each longitudinal side of the strip connecting the strip to the support.

It will be appreciated that, whilst the drawings and following description refer to a sensing element 10 connected to a support by three axes/three pairs of opposed connection points, more axes/connection points are considered to fall within the scope of the present invention. For example, five or seven axes/pairs of opposed connection points may be utilised in one or more embodiments of the present invention, preferably with a central mid point axis/opposed connection pair.

The sensing element is able to flex about the connection points in response to an applied gravity field, and the free ends are free to respond to the gravity field.

It is important, if not critical, to arrange the proper distances between the rotational pivot points and the distance of free ends from the end pivots.

The free ends of the sensing element act as bending counterbalances against the "gravimeter" signal. This feature is absent in the case when the ends of the sensing element are fixed.

Figure 2:
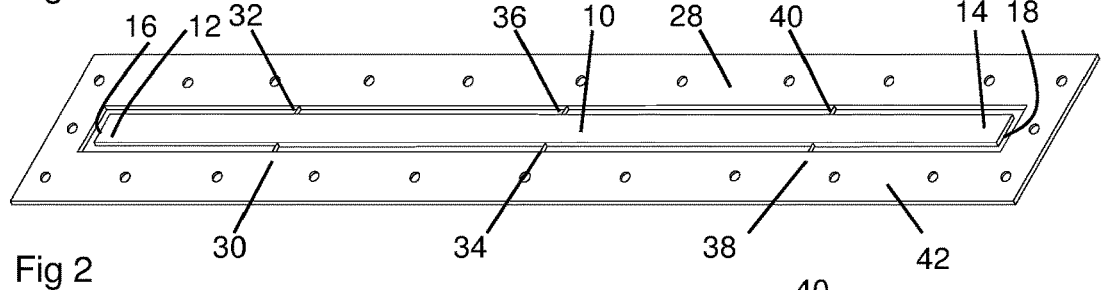
FIG. 2 shows a sensing element inside a support metal sheet according to an embodiment of the present invention.

As shown in FIG. 2, the sensing element 10 can be formed from or attached to a support 28 in the form of a plate.

Preferably the sensing element 10 is formed integral with the support 28 (i.e. one piece) such that the connection points 30-40 are part of the continuous material of support 28 (e.g. as a plate 42) and sensing element.

It will be appreciated that the connection points provide rotational pivots allowing the sensing element to flex and thereby rotate relative to the support at the connection points.

Figure 3:
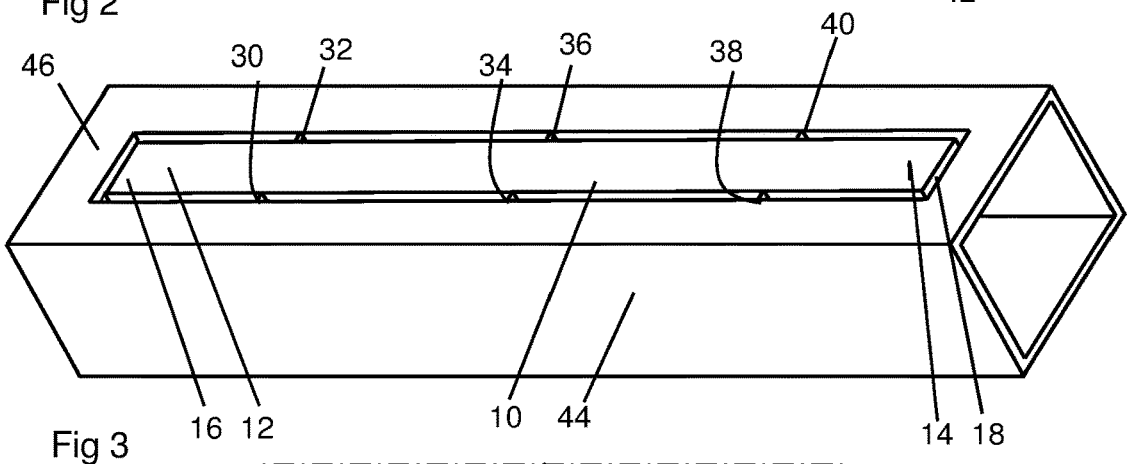
FIG. 3 shows a sensing element forming part of a wall of a rectangular waveguide according to a further embodiment of the present invention.

As shown in FIG. 3, the sensing element 10 may be incorporated as a part of a wave guide 44, such as for a microwave cavity. The sensing element can form part of a side wall 46 of the wave guide.

Figure 4A:
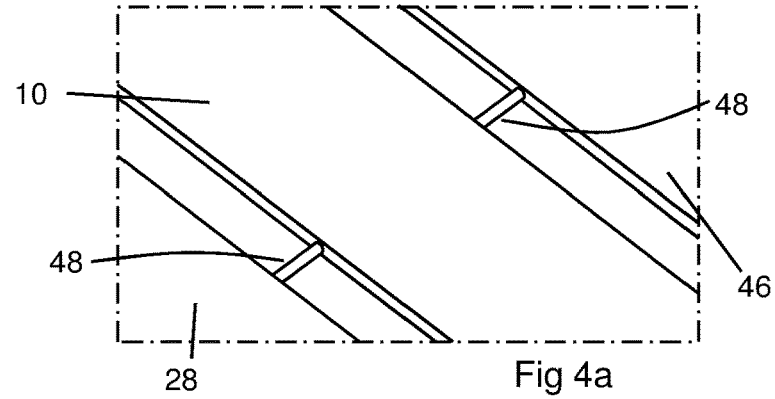
FIGS. 4a and 4b show alternative arrangements of connections connecting the sensing element to a sheet, such as of a side of a waveguide, according to an embodiment of the present invention.
Figure 4B:
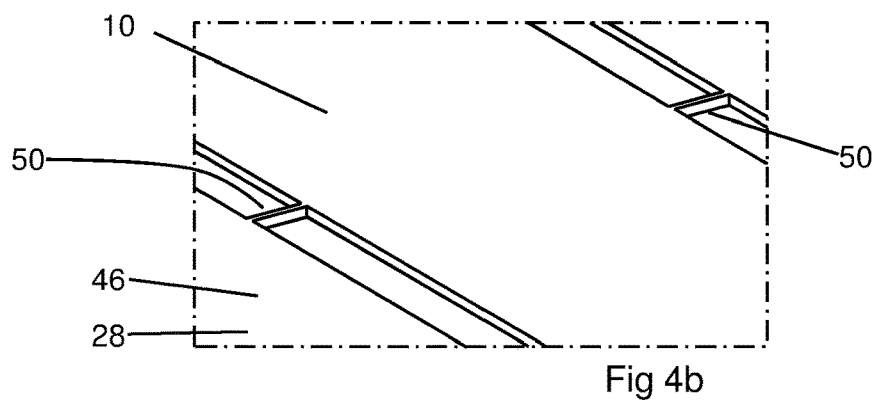

In at least one embodiment of the present invention, the connection points 30-40 are provided as rotational pivots, which may be in the form of small rods 48 (as shown in FIG. 4a) or provided as thin partitions (torsion flexures) 50 holding the sensing element, e.g. a metal strip, preferably retained within the bounds of the support 28, such as a metal sheet side wall 46 shown in FIG. 4b.

The sensing element and the support structure can be made as a whole by electron discharge machining (EDM) or wire cutting process, using a thin metal sheet (see, for example, FIG. 2) or a rectangular metal waveguide (see, for example, FIG. 3).

In another embodiment, the pivot points include (small) pins, preferably cylindrical pins 48 (see, for example, FIG. 4a).

These connection points provided as pins can be inserted into respective holes (preferably drilled holes) in the side edges of the elongate sides extending the length of the strip.

In any case, the sensing element is free to rotate around the (horizontal) axes connecting the pivoting connection points 30-40 on both sides of the (metal) strip.

Importantly, the free opposed ends of said (metal) strip are free to rotate and move laterally as well.

Also, the sensing element possesses new degrees of freedom (modes), due to more boundary conditions and the free ends which are the integral parts of the whole sensing element. These new modes can be used to detect gravitational gradients instead of the S-mode relied on by WO 96/10759, WO 03/027715 and WO 2010/061183.

One of such 'mode' (degree of freedom) is shown in FIG. 5A, referred to herein as "Z-mode", distinguishing that mode of deflection from the S-mode referenced above and used to detect gravitational gradients in referenced patents and other publications.

A non-uniform gravity force NUGF can be understood as comprising a gravity gradient GG varying a uniform gravity force UGF. The non-uniform gravity force NUGF varies from a uniform gravity force UGF and applies a different amount of gravitational force to different portions of the sensing element. This causes distortion of the sensing element from a straight, flat orientation, and the free ends of the sensing element exhibit a larger displacement than the intermediate portion of the sensing element between the two opposed ends.

As shown in FIG. 5B, a sensing element 10 embodying the present invention reacts to the earth's gravitational field $GF_E$. The Earth's gravitational field is known to be several orders of magnitude stronger than any gradient of it.

It is important to note that both ends 16, 18 of the sensing element 10 (such as a ribbon element) move in the same direction (downwards in FIG. 5B in response to the applied gravitational field $GF_E$ (also being downwards as shown), which can be termed a 'W' or 'M' mode after the shape of the sensing element. It will be appreciated that the deflection/bend about the pivot points/axes is exaggerated in the figures to emphasise and show the function of the sensing element.

With microwave sensors provided at both ends of the sensing element, one or more forms of the present invention provides for subtracting the measurement by each microwave sensor from the other. The uniform gravity signal is therefore a common mode signal, and hence eliminated. The gravity gradient is therefore sensed and generates a differential signal.

The physical deflection about the pivots of the sensing element 10 resulting from the uniform gravity field/vector is of course much larger than that from the gradient. It will therefore be appreciated that the deflection is not on the same scale as the differential caused by the gravity gradient, which would be sensed as very small differences in the amount of overall deflection across the sensing element and not just that deflection has occurred.

As shown in FIGS. 6 to 12, the sensing element 10 can be incorporated into one or more resonant cavities or wave guides 52-64 in various arrangements for a gravity gradiometer 11.

In FIG. 6, the sensing element 10 extends through a resonant cavity or wave guide 52, with free ends 12, 14 of the sensing element extending freely from the resonant cavity. The sensing element has rotational points at connection points 30, 32, 34, 36 and 38, 40 permitting the sensing element to flex from a flat orientation 10f about those pivot points as shown when influenced by a gravity gradient to a displaced orientation 10d (also respectively shown for a flat orientation 10f and an as influenced by a gravity gradient displacement orientation 10d for further embodiments of the present invention as represented in FIGS. 7 to 12 and described below).

FIG. 7 shows the sensing element 10 as a side wall or part of a side wall of the resonant cavity or wave guide 52.

FIG. 8 shows the sensing element passing through two resonant cavities or wave guides 54, 56 with the free ends 12, 14 of the sending element extending beyond both cavities.

In FIG. 9, the sensing element 10 forms a side wall or part of a side wall of the two resonant cavities or wave guides 54, 56. However, the free ends 12, 14 of the sensing element still extend beyond the resonant cavities.

In FIG. 10, the sensing element 10 forms a partition between two conjoined resonant cavities 54, 56 i.e. the sensing element forms part of the common boundary between the two cavities or guides.

FIG. 11 shows two pairs of conjoined resonant cavities or wave guides 54,56 and 58,60 with the sensing element forming the partition between each pair, as in FIG. 10.

FIG. 12 shows the sensing element with its free ends 12, 14 located within (but not fixed to) spaced resonant cavities or wave guides 62, 64.

According to another form of the present invention, the maximum lateral mechanical displacement(s) of the sensing element can be detected by microwave cavities, preferably including an interferometric output.

Figure 13:
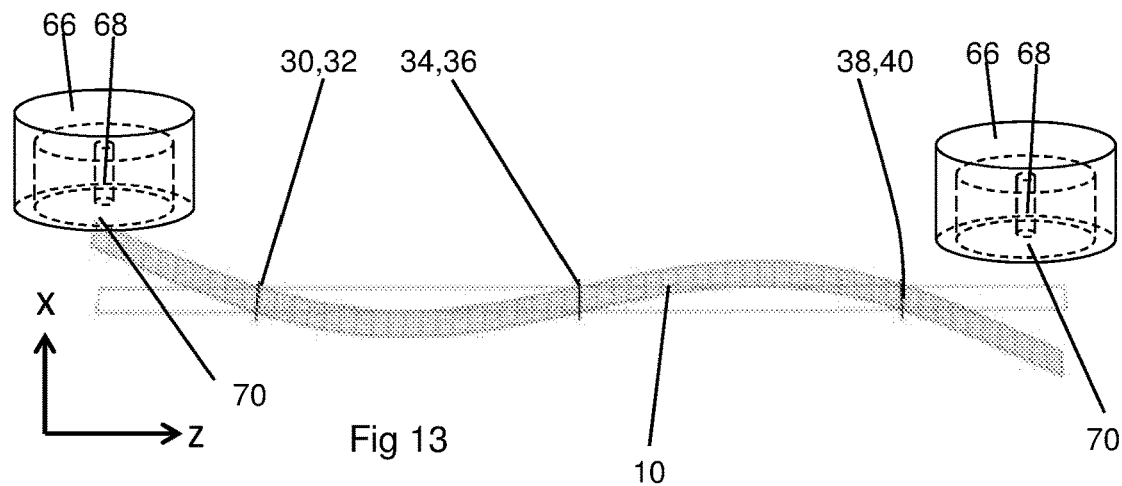
FIG. 13 shows an embodiment of the present invention including cavity resonators configured detect movement of the free ends of the sensing element.

For example, as shown in FIG. 13, displacement of each of the free ends 12, 14 of the sensing element can be detected. Preferably, cavity resonators or lumped element resonators $66_1$, $66_2$ may be provided. For example, at least one cavity resonator or lumped element resonator may be provided toward or at each end of the sensing element, and preferably disposed relative to each other substantially on the same side of the sensing element.

It will therefore be appreciated that the sensing element 10 (such as an electromechanical ribbon/strip) may form the part of a wall of a resonator, or internal to the resonant structure, where the electromagnetic mode is shifted in frequency by mechanical oscillation of the ribbon/strip.

The mechanical element (or oscillator) can be configured in a way to modulate electromagnetic waves at microwave or radio frequencies. Therefore, the system/apparatus is configured as an electro-mechanical system.

Standard cavity resonators or lumped element resonators $66_1$, $66_2$ can be employed. An example of a lumped element resonator 66 is a re-entrant cavity consisting of a post 68 and a gap 70, which is modulated by the free ends of the strip/ribbon as shown, for example, in FIG. 13.

The sensing element 10 may be housed in a housing. The resonators 66 may be mounted to the housing. The housing may include a copper metal structure, and may be predominantly of copper.

Preferably, a first resonator (or other displacement sensor or displacement sensing part thereof) may be provided at one end of the sensing element and opposite one side or face of the sensing element, and a second resonator (or other displacement sensor or displacement sensing part thereof) may be opposite the same side or face of the sensing element as the first resonator (or other displacement sensor or displacement sensing part thereof).

That is, both the first and second resonators (or other displacement sensor or displacement sensing part thereof) may be on the same side but at different ends of the sensing elements. For example, for a sensing element according to an embodiment of the present invention (such as an elongate 'ribbon' type sensing element), a resonator or displacement sensor may be provided at each end of the sensing element at the same side or face of the sensing element. The resonators may both be above or below the sensing element, but both are either above or below. Thus, it will be appreciated that when the signals from each displacement sensor incorporating the resonator at each end of the device are subtracted from each other, the common mode signal and other noise that is common mode are eliminated.

As indicated with reference to FIG. 14, resonant structures/apparatus can be provided in a way to enhance the displacement sensitivity in terms of metres displaced by the mechanical element per Hz frequency shift of the electromagnetic resonance (df/dx in m/Hz).

Also, minimizing microwave losses is desirable to create a high-Q resonance sensor so that the product of Q and df/dx is maximized.

To maximise the Q-factor and minimise the losses the structure can be made from high conductivity metal, or low-loss dielectric.

To maximise the df/dx, a structure is devised that enhances the photon field near the anti-node of the oscillating mechanical field, thereby realising a large electromechanical coupling. This may be achieved by implementing one or more resonant or waveguide structures as depicted in FIG. 6 through FIG. 12.

One or more resonators 66 (such as resonators 66$_1$, 66$_2$) can be implemented, to either measure the mechanical oscillator anti-nodes simultaneously or individually in a single resonator or by implementing more than one separate resonator.

To read out the signal, the microwave resonators are excited at the resonant frequencies with an external microwave source 59.

Figure 14A:
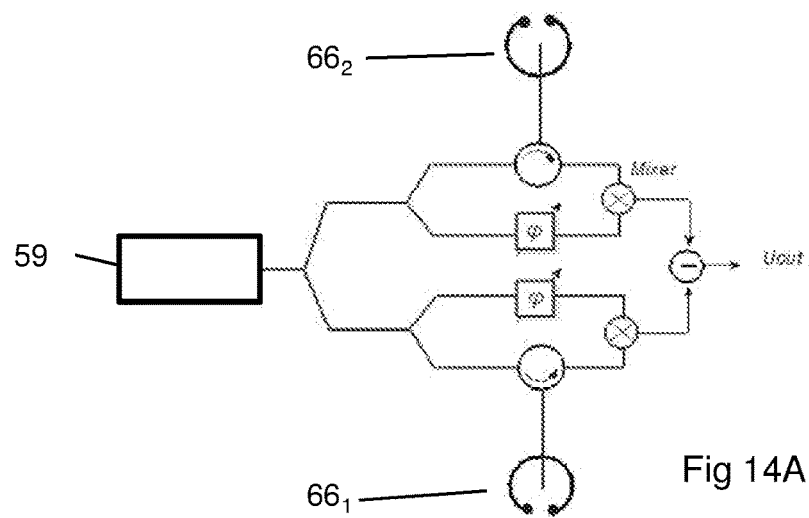
FIG. 14A shows an example of a phase sensitive system to measure displacement, according to or applicable to at least one embodiment of the present invention.

Output for readout is preferably achieved using a phase sensitive system. An example of such sensitive interferometric system is shown in FIG. 14A.

By way of reference to those interested, the noise analysis of microwave interferometers has been published (e.g. "Application of the interferometric noise measurement technique for the study of intrinsic fluctuations in microwave isolators", Ivanov, Tobar and Woode, 1998).

It has been found that, by using a microwave interferometric read-out, ultra-precision displacement measurements of less that $10^\wedge(-14)$ m/rootHz can be made utilising an apparatus embodying the present invention. This can result in reaching 1 Eötvos/rootHz or less noise floor of the proposed gravity gradiometer 11 apparatus at room temperature.

Alternatively, optical means may be used for precision displacement sensing, such as grating coupled resonant structures, e.g. such as described in patent document US201600231352, the contents of which are incorporated herein in their entirety.

Figure 14B:
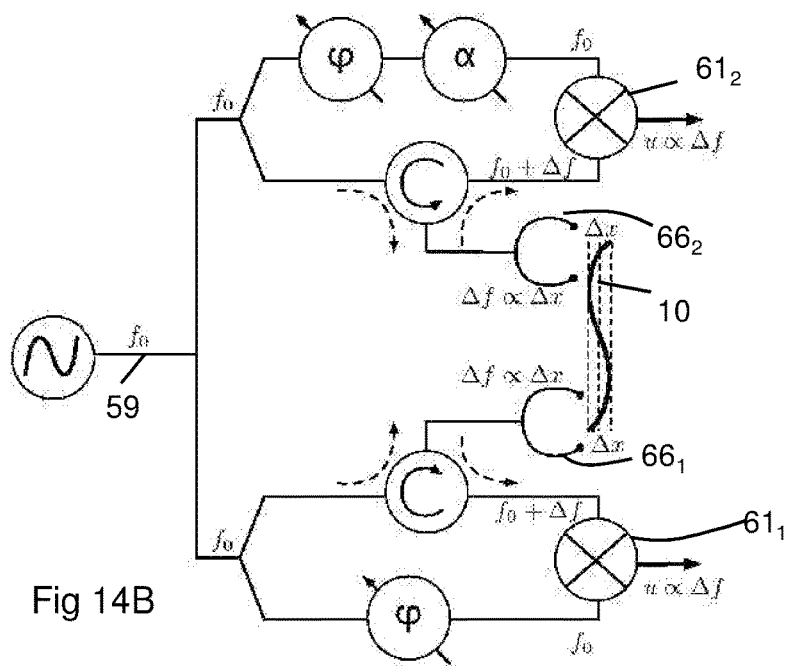
FIG. 14B shows a dual phase bridge setup according to an embodiment of the present invention.

As shown in greater detail in FIG. 14B, a dual phase bridge 61$_1$, 61$_2$ arrangement (or 'pick ups') can be provided. The dual phase bridge arrangement can be based off resonators 66.

As the sensing element vibrates, the air gap between the sensing element and a detector element 68, such as a metal post, is changed by a distance delta x (x). This change in air gap distance creates a change in frequency (delta f or f) of the resonance. The phase bridge arrangement converts this f into a voltage u, which can be measured, output to a display and/or recorded.

By modulating the synthesizer source, the conversion efficiency of each phase bridge arrangement 61$_1$, 61$_2$ can be measured. The change in voltage output for a change (delta) in the resonant frequency u/f, which can be measured as the gradient of the slope of the voltage u plotted against the resonant frequency f. Sufficiently equal gradients crossing a plot/graph of the voltage vs the resonant frequency for the phase bridge arrangements indicates correct operation of the differential i.e. the differential between sensing at each end of the sensing element is sufficiently low or zero to be negated.

Once the modulation is switched off, the vibrational noise read by each of the phase bridge arrangements (pick ups) can be displayed and/or recorded.

Signals from the resonators 66 (or at least one other displacement sensor, such as an optical displacement sensor) can be filtered and amplified and used to drive a current through the sensing element 10. Such current creates a force on the portion of the sensing element adjacent to the magnets 74, which in turn causes the opposed ends of the sensing element to deflect and such deflection is detected by the respective deflection sensor, such as a resonator or optical sensor. This suppresses vibrational 'noise' of the sensing element (such as a metallic ribbon, such as a copper ribbon) arising from the symmetric mode. It will be appreciated that displacement sensing can include sensing by other than magnetic sensing, such as electromagnetic (including optionally optical, microwave, infra red etc.). Inductive variable proximity sensing may alternatively or also be used.

A tilt sensor can be provided for applications of the present invention relating to gravity gradiometry using a static (stationary) gravity gradiometer 11. For example, if the sensing element and/or the housing or support for the sensing element is titled from horizontal (e.g. relative to the sensing element when it is straight), such tilt sensing may be used as angular sensing for compensation purposes to correct for the gradiometer not being horizontal.

One or more embodiments of the present invention includes the sensing element having more control places for applying thereto feed-forward signals, such as from ancillary devices, e.g. precision gyros and accelerometers, in order to cancel out various motion effects. This allows the sensing element to act both as a sensitive element and a stabilised platform as a whole.

Consequently, a gravity gradiometer embodying the present invention can be deployed inside an unmanned aerial vehicle (UAV), or other remotely operated or manned vehicle, with limited space and mounting conditions.

Figure 16:
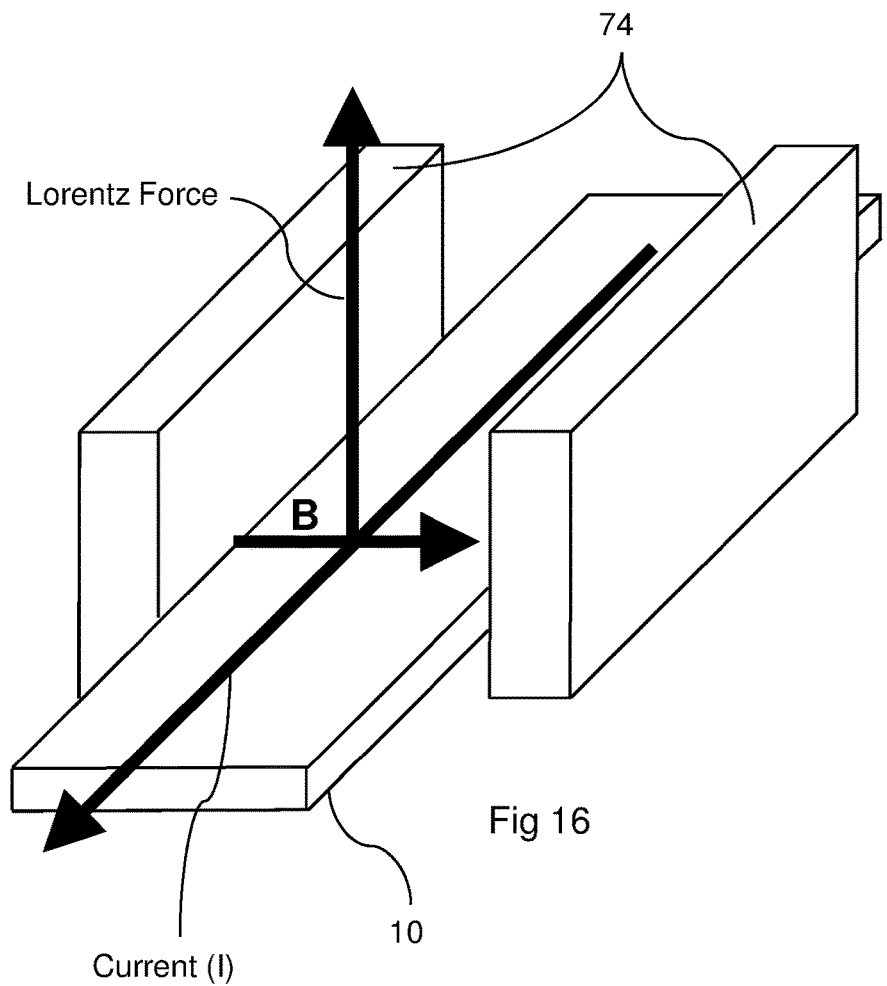
FIG. 16 shows an arrangement of magnets adjacent a sensing element, according to an embodiment of the present invention.

Modulation can be applied indirectly by using permanent magnets 74 positioned near maximum mechanical displacement points in between the intermediate pivot/mid pivot and the side pivots to either side of the respective intermediate pivot/mid pivot, such as depicted in FIG. 16.

Figure 17:
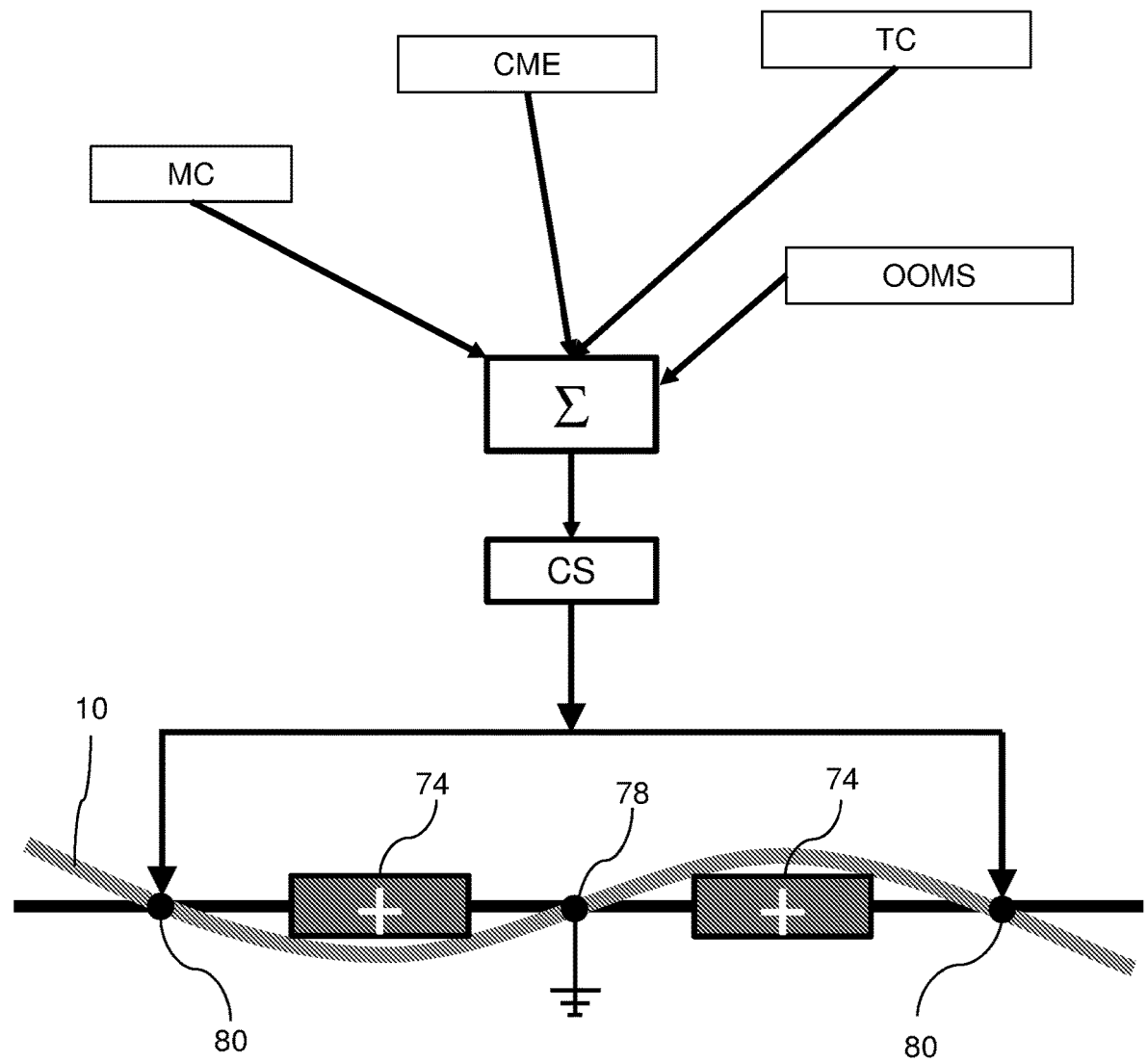
FIG. 17 shows an example that includes feed-forward compensation for movement, such as applicable to moving-base applications, according to an embodiment of the present invention.

FIG. 17 illustrates an embodiment showing how various feedback and feed-forward signals can be combined into a single current that is fed (such as from a current source CS) through the sensing element 10, e.g. by providing isolated pivots 80.

A common mode error signal CME can be provided by a common mode signal from a microwave interferometer.

Temperature compensation TC can be provided as a feed forward signal.

An on-off modulation signal (OOMS) can be applied/input to switch the sensor between modulated and unmodulated states, which through subsequent demodulation of the sensor output signal facilitates elimination of 1/f noise.

The applied current (such as form the current source CS) results in the desired compensation and feed forward forces as it passes from the side pivots 80, past the magnets 74, and returning to the support via the grounded mid pivots 78.

Feed forward motion compensation (MC or FFMC) can be applied as part of the determination of the current.

Applying electrical current into the opposed longitudinal sides, such as right and left sides, of the sensing element, such as a ribbon, can be used for several types of compensation.

When calibrating the sensing element for steady state conditions, and depending on the orientation of the sensing element relative to the earth's gravity force, the ends facing the microwave cavity may be significantly displaced from their nominal position.

Compensation current can be applied to the sensing element to bring the sensing back into a straight line, resulting in the distal end (tip) of each end being at an optimal operation position of maximum sensitivity for sensing of gravity gradients.

Preferably, the sensing element, such as a copper ribbon element, can be operated from a horizontal orientation, which helps reduce sensitivity to vibrations and equalises sensitivity to vibrations between the pickups provided at each end of the sensing element.

Figure 18:
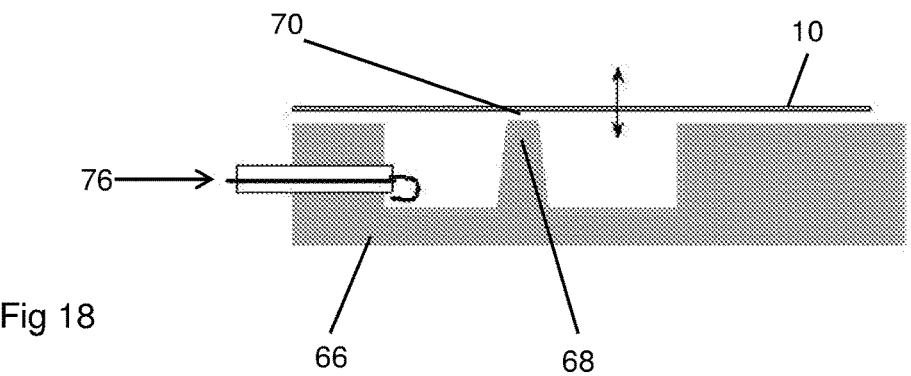
FIG. 18 shows an example of a lumped element resonator and free end sensing element according to an embodiment of the present invention.

FIG. 18 shows the cross section of a re-entrant cavity resonator 66 of the type shown in FIG. 13, showing a post 68, a vibrating metal strip representing the sensing element 10, the gap between the two, and the microwave excitation signal 76.

Microwave interferometric read-outs as a means of ultra-precision displacement measurement and (feed-forward) motion compensation MC (or FFMC) can also be used for sensors (with fixed ends).

Figure 19:
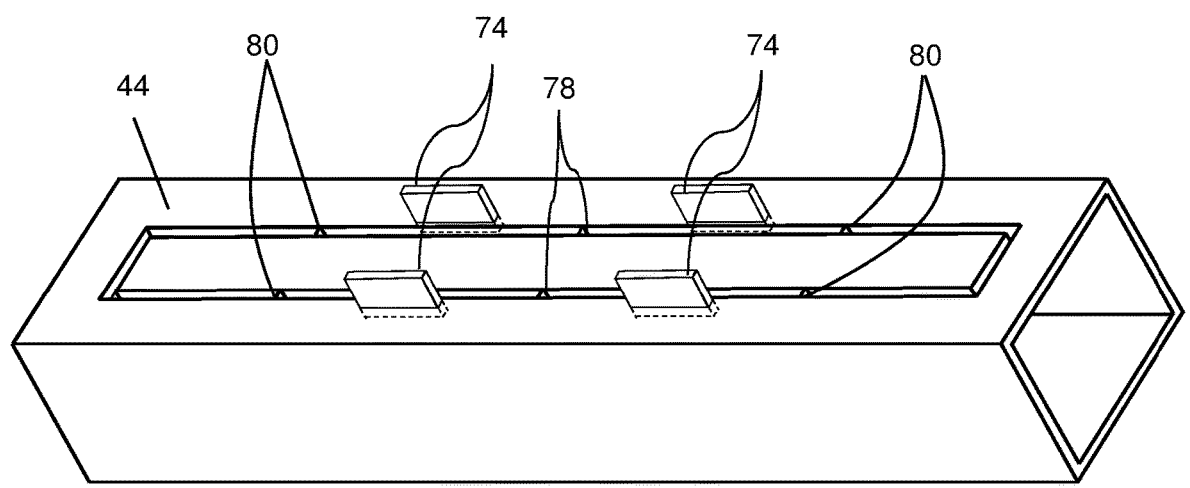
FIG. 19 shows a sensing element (with fixed ends) forming part of a wall of a rectangular waveguide, i.e. incorporated into the wall of a microwave resonator, and an arrangement of magnets adjacent to the sensing element.

FIG. 19 shows such an arrangement according to an embodiment of the present invention, where a sensing element forms the wall of a microwave wave guide 44.

In addition, an arrangement of magnets 74 adjacent to the sensing element and isolated pivots 78 enable modulation and motion compensation as previously described in FIG. 17.

A current may be applied to the sensing element 10 of the gravity gradiometer for calibration, optimisation or compensation purposes, for example, compensating for gravitational effects on the sensing element. The applied electrical current can be used to force the sensing element to straighten from a deflected orientation caused by a gravity field. This provides a steady state orientation, such as allowing for local gravity field strength.

Figure 15:
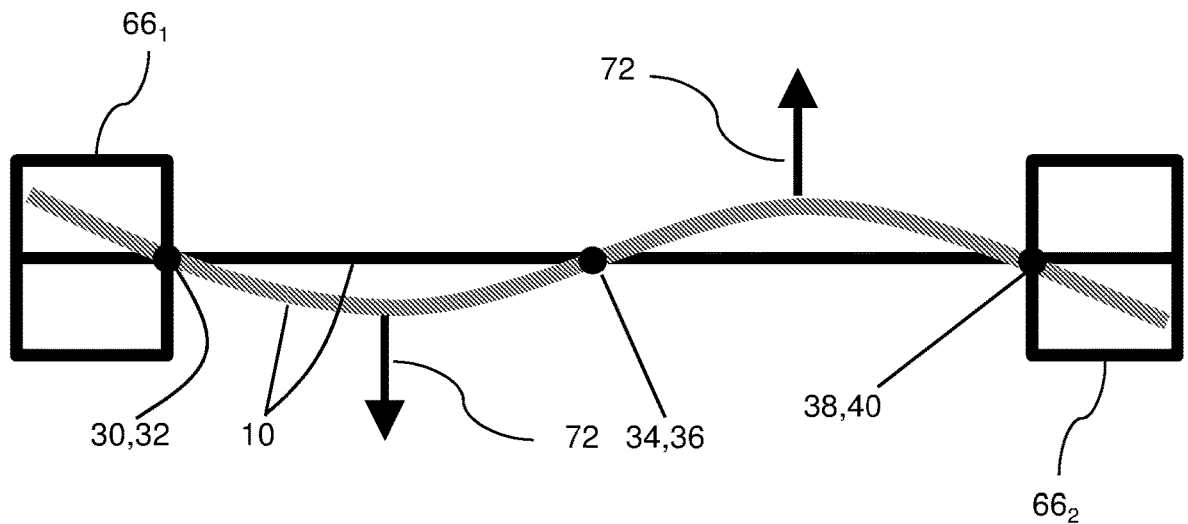
FIG. 15 shows an example of applied compensation force according to an embodiment of the present invention.

Such a calibration, optimisation or compensation technique can be applied separate to, or in addition to, feed-forward compensation for motion effects of the sensing element described above. For example, the position/orientation of the or each sensing element end 16, 18 (e.g. ribbon tip) relative to a respective microwave cavity interface (such as in FIG. 13 or 15) can be controlled by applying the electrical current to the sensing element to maintain the or each respective end spaced at an optimal operating point for maximum sensitivity of the gravity gradiometer.

Figure 20:
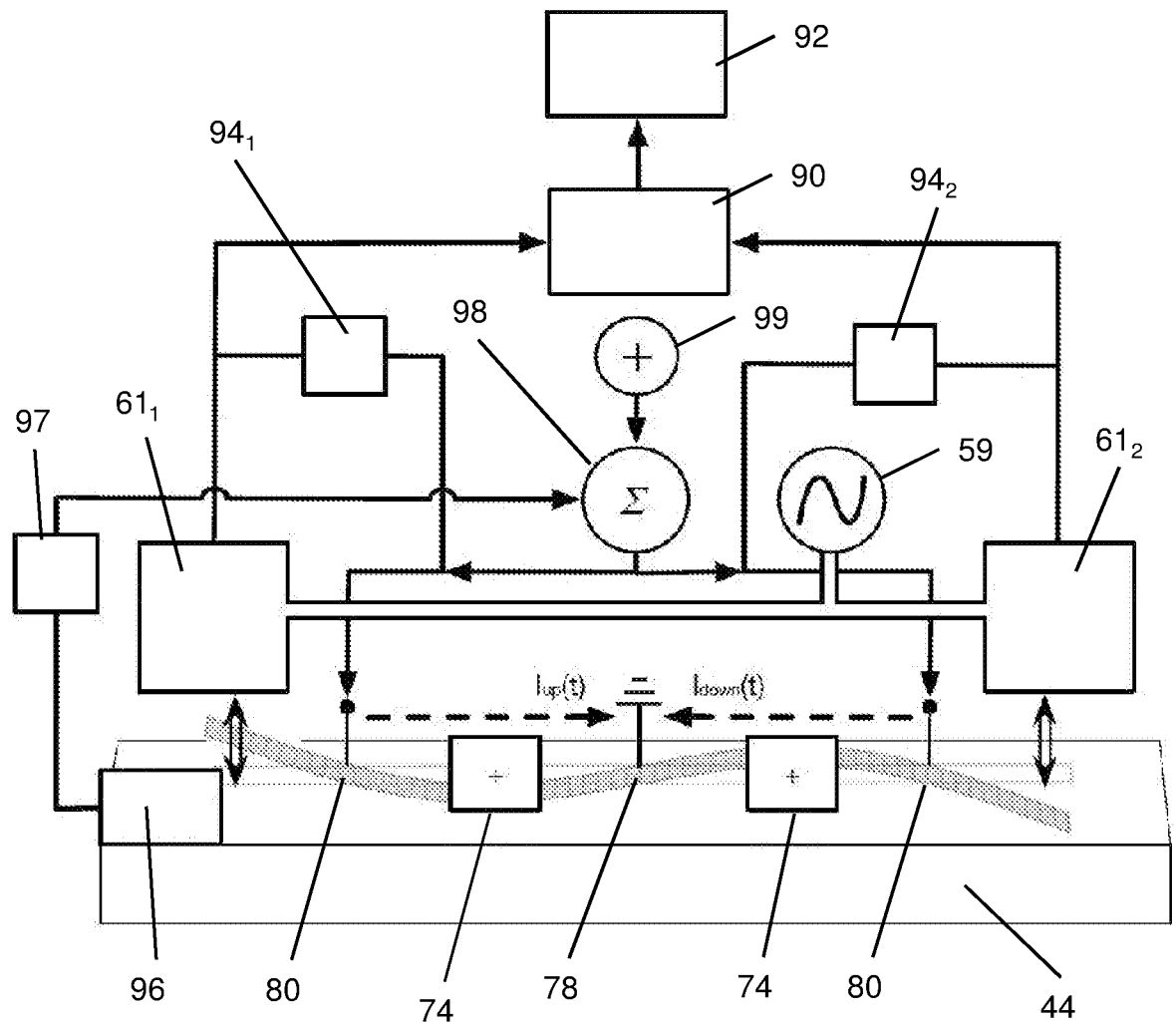
FIG. 20 shows a block diagram of a preferred embodiment of the present invention.

FIG. 20 shows a block diagram of a preferred embodiment of the invention. Synthesizer 59 is connected to both sides of the microwave interferometric phase bridge $61_1$, $61_2$. The signal output from each of the sides is subtracted in a differential amplifier 90 providing the gravity gradient signal to be captured by a data acquisition system 92.

The signal from each of the sides of the phase bridge is amplified and filtered by filter $94_1$, $94_2$ and used to generate a compensation current $I_{up}(t)$ and $I_{down}(t)$ for each respective side of the sensor.

A motion sensor 96 is mounted on the sensor frame or waveguide 44, and the signal is processed by filter 97 to generate a feed forward motion compensation signal, translated to a compensation current via a summing device 98.

Direct current (DC) bias 99 is applied to bias sensing at an optimum operating point for maximum sensitivity to gravity gradients, and preferably as well as tuning the two resonators to the same operating frequency, typically to compensate deflection due to the earth's gravity field and asymmetries in the sensing element (e.g. ribbon) and the resonators.

The invention claimed is:

1. An apparatus for measuring direct gravity gradients, the apparatus including: a flexible, elongate sensing element connected to a support at connection points disposed along opposed side edges of the sensing element, the sensing element having opposed free ends, wherein the connection points are provided at a mid-point of the sensing element and intermediate the mid-point and each respective said free end of the sensing element, and the apparatus including at least one displacement sensor configured to detect deflection of the free ends of the sensing element due to a gravitational field acting on the sensing element.

2. The apparatus of claim 1, further including read-out means provided at or adjacent to edges of the opposed free ends of the sensing element for recording measurements of one or more mechanical displacements of the sensing element.

3. The apparatus of claim 1, wherein the sensing element is of or incorporates an electrically conductive material, and wherein magnets are provided adjacent to the sensing element between the mid-point connection and the respective connection intermediate the mid-point and the respective free end, and a force is generated on the portion of the sensing element adjacent to the magnets by a current fed through the sensing element, thereby providing a feedback force application means to apply a feedback force at displacement nodes located in between the mid-point connection point and the connection points intermediate the mid-point and the free ends.

4. The apparatus of claim 1, wherein the sensing element includes a flat strip or ribbon of material.

5. The apparatus of claim 1, wherein the sensing element is mounted to or integral to the support.

6. The apparatus of claim 1, wherein the connections points include pins or flexure members.

7. The apparatus of claim 1, further including wherein the sensing element is of or incorporates an electrically conductive material, and wherein magnets are provided adjacent to the sensing element between the mid-point connection and the respective connection intermediate the mid-point and the respective free end, and a force is generated on the portion of the sensing element adjacent to the magnets by a current fed through the sensing element, thereby providing a modulation means and/or a de-modulation means to respectively modulate and/or demodulate signals resulting from one or more detected direct gravity gradients.

8. The apparatus of claim 1, wherein the sensing element forms at least part of a side wall of a resonant cavity or wave guide or at least partly fills an opening through a side wall of the resonant cavity or wave guide.

9. The apparatus of claim 1, wherein the sensing element forms at least part of a partition between two adjacent or conjoined resonant cavities or wave guides.

10. The apparatus of claim 1, wherein the displacement sensor includes an optical displacement sensor.

11. The apparatus of claim 1, including an input receiving signals from at least one ancillary device, wherein the sensing element is of or incorporates an electrically conductive material, and wherein magnets are provided adjacent to the sensing element between the mid-point connection and the respective connection intermediate the mid-point and the respective free end, and a force is generated on the portion of the sensing element adjacent to the magnets by a current fed through the sensing element, thereby providing a means to utilize the received signals to generate a feed-forward compensation signal to cancel out certain motion characteristics of the sensing element.

12. The apparatus of claim 11, wherein the at least one ancillary device includes at least one gyroscope or at least one accelerometer, or a combination of two or more thereof.

13. A method of detecting a gravity gradient including measuring displacement of at least one free end of the sensing element of the apparatus of claim 1.

14. The method of claim 13, further including detecting a gravity gradient without spatially repositioning the apparatus.

15. The method of claim 13, further including detecting a gravity gradient with a single reading from each of at least one displacement sensor(s) at a particular moment in time.

16. The method of claim 13, wherein displacement of the free ends of the sensing element is used for mechanical displacement measurements while nodes intermediate the free ends of the sensing element are used for applying feedback forces.

17. A method of calibrating, optimising or compensating for gravitational effects on a sensing element of the apparatus of claim 1 includes introducing electrical current into the sensing element to force the sensing element to straighten from a deflected orientation caused by a gravity field.

18. The method of claim 17, including applying the current separate to or in addition to feed-forward compensation for motion effects of the sensing element.

19. The method of claim 17, including positioning one or both ends of the sensing element relative to a respective microwave cavity interface spaced at an optimal operating point for maximum sensitivity by controlling the applied current.

* * * * *

UNITED STATES PATENT AND TRADEMARK OFFICE
CERTIFICATE OF CORRECTION

PATENT NO.         : 11,002,878 B2
APPLICATION NO.    : 16/342926
DATED              : May 11, 2021
INVENTOR(S)        : Alexey Vladimirovich Veryaskin et al.

It is certified that error appears in the above-identified patent and that said Letters Patent is hereby corrected as shown below:

In the Claims

In Claim 7 at Column 16, Line 64, delete "further including".

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*